United States Patent
Tsuchiya et al.

(10) Patent No.: US 9,512,981 B2
(45) Date of Patent: Dec. 6, 2016

(54) LUMINAIRE FOR INTERIOR LAMP PROVIDED IN AUTOMOBILE

(71) Applicant: Toshiba Lighting & Technology Corporation, Yokosuka-shi, Kanagawa-ken (JP)

(72) Inventors: Ryuji Tsuchiya, Yokosuka (JP); Youhei Matsuda, Yokosuka (JP); Junichiro Yamamoto, Yokosuka (JP); Kazufumi Yoshida, Yokosuka (JP)

(73) Assignee: Toshiba Lighting & Technology Corporation, Yokosuka-shi, Kanagawa-ken (JP)

( * ) Notice: Subject to any disclaimer, the term of this patent is extended or adjusted under 35 U.S.C. 154(b) by 51 days.

(21) Appl. No.: 14/184,993

(22) Filed: Feb. 20, 2014

(65) Prior Publication Data

US 2014/0369049 A1   Dec. 18, 2014

(30) Foreign Application Priority Data

Jun. 17, 2013   (JP) ................................. 2013-127007

(51) Int. Cl.

| | |
|---|---|
| *G09F 13/08* | (2006.01) |
| *G09F 13/10* | (2006.01) |
| *F21V 11/00* | (2015.01) |
| *F21V 3/02* | (2006.01) |
| *F21V 3/04* | (2006.01) |
| *F21V 13/10* | (2006.01) |

(Continued)

(52) U.S. Cl.
CPC ............. *F21V 11/00* (2013.01); *B60Q 3/0279* (2013.01); *F21K 9/60* (2016.08); *F21V 3/02* (2013.01); *F21V 3/049* (2013.01); *F21V 3/0445* (2013.01); *F21V 13/10* (2013.01); *F21W 2101/08* (2013.01); *F21Y 2105/10* (2016.08); *F21Y 2115/10* (2016.08)

(58) Field of Classification Search
CPC .................................................. F21Y 2105/001
See application file for complete search history.

(56) References Cited

U.S. PATENT DOCUMENTS

| | | | | |
|---|---|---|---|---|
| 6,011,929 A | * | 1/2000 | Fuke et al. .................... | 396/175 |
| 6,632,004 B2 | * | 10/2003 | Sugawara et al. ............ | 362/281 |

(Continued)

FOREIGN PATENT DOCUMENTS

| | | |
|---|---|---|
| DE | 10 2010 041478 A1 | 3/2012 |
| EP | 2479480 A1 | 7/2012 |

(Continued)

OTHER PUBLICATIONS

Oct. 22, 2014—(EP) Extended Search Report—App 14155528.4.
Oct. 30, 2015—(EP) Office Action—App 14155528.4.

*Primary Examiner* — Peggy Neils
*Assistant Examiner* — Alexander Garlen
(74) *Attorney, Agent, or Firm* — Banner & Witcoff, Ltd.

(57) ABSTRACT

According to one embodiment, there is provided a luminaire including a light-emitting element and a cover provided on an irradiation side of the light-emitting element. The cover includes a first light transmitting section provided on the center side of the cover and a second light transmitting section provided at the peripheral edge of the first light transmitting section and having light transmittance higher than the light transmittance of the first light transmitting section.

19 Claims, 5 Drawing Sheets

(51) Int. Cl.
*B60Q 3/02* (2006.01)
*F21W 101/08* (2006.01)

(56) References Cited

U.S. PATENT DOCUMENTS

| | | | |
|---|---|---|---|
| 7,467,486 B2 * | 12/2008 | Kaoh | G09F 13/22 |
| | | | 40/551 |
| 7,841,748 B2 * | 11/2010 | Rodstein et al. | 362/307 |
| 2008/0310158 A1 * | 12/2008 | Harbers et al. | 362/240 |
| 2010/0124243 A1 * | 5/2010 | Hussell et al. | 372/45.01 |
| 2010/0284194 A1 | 11/2010 | Miyashita et al. | |
| 2013/0083526 A1 * | 4/2013 | Kadoriku et al. | 362/235 |
| 2013/0176741 A1 * | 7/2013 | Nakamura et al. | 362/347 |
| 2013/0223057 A1 | 8/2013 | Gassner et al. | |
| 2013/0242567 A1 * | 9/2013 | Ariyoshi | 362/311.02 |
| 2013/0335966 A1 | 12/2013 | Yokota et al. | |

FOREIGN PATENT DOCUMENTS

| | | |
|---|---|---|
| JP | 2012-206603 A | 10/2012 |
| WO | 2012/124637 A1 | 9/2012 |

* cited by examiner

LUMINAIRE FOR INTERIOR LAMP PROVIDED IN AUTOMOBILE

CROSS-REFERENCE TO RELATED APPLICATIONS

This application is based upon and claims the benefit of priority from Japanese Patent Application No. 2013-127007, filed on Jun. 17, 2013; the entire contents of which are incorporated herein by reference.

FIELD

Embodiments described herein relate generally to a luminaire.

BACKGROUND

There is a luminaire including a light emitting diode (LED) and a translucent cover provided on an irradiation side of the light emitting diode.

In such a luminaire, a plurality of convex sections are provided on the inner side surface and the outer side surface of the cover to diffuse light irradiated from the light emitting diode.

If the cover for diffusing the light irradiated from the light emitting diode is provided, it is possible to suppress glare.

However, on the other hand, a rendering property is lost.

DETAILED DESCRIPTION

In general, according to first embodiment, there is provided a luminaire including: a light-emitting element; and a cover provided on an irradiation side of the light-emitting element. The cover includes: a first light transmitting section provided on the center side of the cover; and a second light transmitting section provided at the peripheral edge of the first light transmitting section and having light transmittance higher than the light transmittance of the first light transmitting section.

With the luminaire, it is possible to attain suppression of glare and improvement of a rendering property through a glittering feeling.

According to a second embodiment, in the luminaire according to the first embodiment, the light scattering property of the first light transmitting section is higher than the light scattering property of the second light transmitting section. The light rectilinearity of the second light transmitting section is higher than the light rectilinearity of the first light transmitting section.

With the luminaire, it is possible to attain suppression of glare and improvement of a rendering property through a glittering feeling.

According to a third embodiment, in the luminaire according to the first embodiment, the second light transmitting section includes: an incident surface on which light irradiated from the light-emitting element is made incident; and a first irradiation surface configured to irradiate the light made incident from the incident surface of the second light transmitting section toward the front surface side of the luminaire. The incident surface of the second light transmitting section is provided in a position where direct light emitted from the light-emitting element can be made incident.

With the luminaire, it is possible to attain suppression of glare and improvement of a rendering property through a glittering feeling.

According to a fourth embodiment, in the luminaire according to the first embodiment, the second light transmitting section includes: an incident surface on which light irradiated from the light-emitting element is made incident; and a first irradiation surface configured to irradiate the light made incident from the incident surface of the second light transmitting section toward the front surface side of the luminaire. The incident surface of the second light transmitting section is provided in a direction crossing the first irradiation surface.

With the luminaire, it is possible to attain suppression of glare and improvement of a rendering property through a glittering feeling.

According to a fifth embodiment, in the luminaire according to the third embodiment, the second light transmitting section further includes a reflection surface provided on the opposite side of a light incident side of the incident surface and configured to reflect the light made incident from the incident surface toward the first irradiation surface.

With the luminaire, it is possible to improve light extracting efficiency via the second light transmitting section.

According to a sixth embodiment, in the luminaire according to the third embodiment, the second light transmitting section further includes a second irradiation surface configured to irradiate the light in a direction different from a direction in which the first irradiation surface irradiates the light.

With the luminaire, since the light is irradiated on the surface of a wall around the luminaire, it is possible to cause a user to feel the spread of the light and it is possible to increase a feeling of brightness.

According to a seventh embodiment, in the luminaire according to the first embodiment, diffusion treatment is applied to at least one of an incident surface and an irradiation surface of the first light transmitting section.

According to an eighth embodiment, in the luminaire according to the first embodiment, a scattering layer including a scattering material is provided on at least one of an incident surface and an irradiation surface of the first light transmitting section.

According to a ninth embodiment, in the luminaire according to the first embodiment, the first light transmitting section is formed of a translucent material including a scattering material.

According to a tenth embodiment, in the luminaire according to the first embodiment, light linear transmittance in the first light transmitting section is equal to or lower than 60%.

According to an eleventh embodiment, in the luminaire according to the first embodiment, light linear transmittance in the first light transmitting section is equal to or higher than 30% and equal to or lower than 50%.

According to a twelfth embodiment, in the luminaire according to the first embodiment, light linear transmittance in the second light transmitting section is equal to or higher than 80%.

According to a thirteenth embodiment, in the luminaire according to the first embodiment, the second light transmitting section further includes a connection surface opposed to the peripheral edge of the first light transmitting section.

According to a fourteenth embodiment, in the luminaire according to the thirteenth embodiment, the connection surface and an incident surface of the second light transmitting section are present in the same plane.

According to a fifteenth embodiment, in the luminaire according to the third embodiment, a plurality of concave sections are provided on the incident surface and the first irradiation surface of the second light transmitting section.

According to a sixteenth embodiment, in the luminaire according to the third embodiment, in the incident surface of the second light transmitting section, an end on the light-emitting element side inclines to a direction toward the outside of the luminaire.

According to a seventeenth embodiment, in the luminaire according to the third embodiment, the first irradiation surface of the second light transmitting section is provided to be parallel to an irradiation surface of the first light transmitting section.

According to an eighteenth embodiment, in the luminaire according to the third embodiment, the first irradiation surface of the second light transmitting section and an irradiation surface of the first light transmitting section are present in the same plane.

According to a nineteenth embodiment, in the luminaire according to the fifth embodiment, in the reflection surface of the second light transmitting section, an end on the outer side of the luminaire inclines to a direction approaching the first irradiation surface of the second light transmitting section.

According to a twentieth embodiment, in the luminaire according to the sixth embodiment, the second irradiation surface of the second light transmitting section is provided in a direction crossing the first irradiation surface of the second light transmitting section.

Embodiments are illustrated below with reference to the drawings. Note that, in the drawings, the same components are denoted by the same reference numerals and signs and detailed explanation of the components is omitted as appropriate.

In the following explanation, the luminaire according to an embodiment is an interior lamp provided in an automobile or the like. However, the use of the luminaire is not limited to this.

The luminaire according to the embodiment can also be applied to, for example, interior lamps provided in mobile bodies such as a railroad vehicle, an airplane, and a ship and interior lamps provided in a house and the like.

Figure 1:
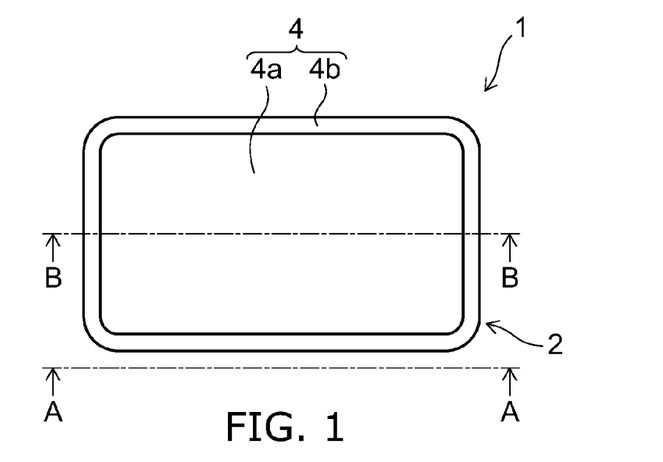
FIG. 1 is a schematic plan view for illustrating a luminaire according to an embodiment.
Figure 2:
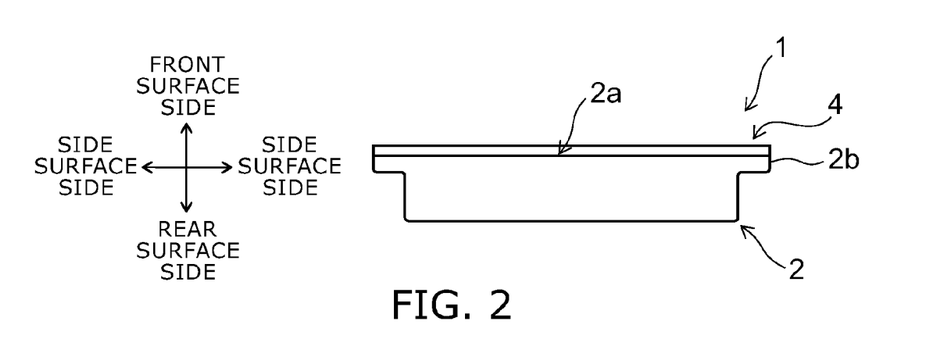
FIG. 2 is a schematic side view for illustrating the luminaire.
Figure 3:
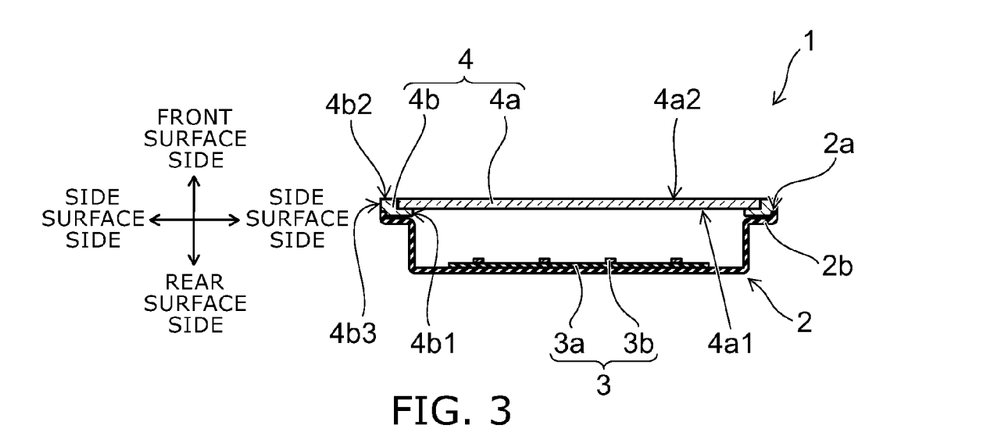
FIG. 3 is a schematic sectional view for illustrating the luminaire.
Figure 4:
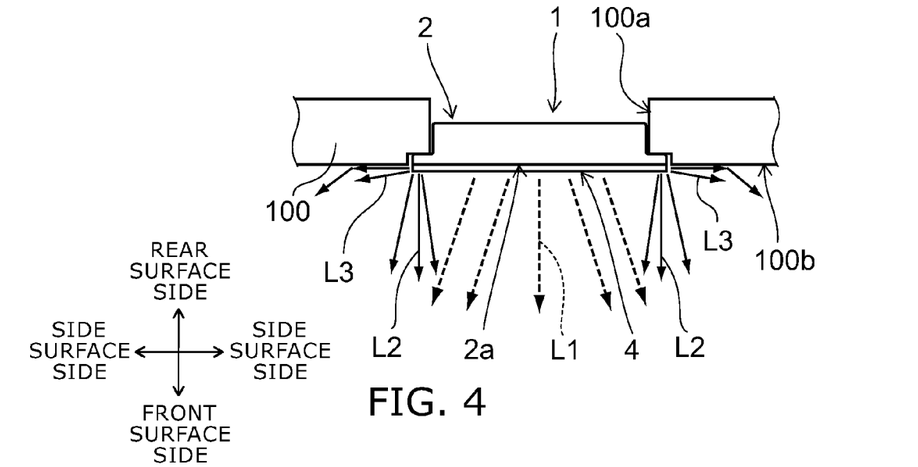
FIG. 4 is a schematic diagram for illustrating a setting state of the luminaire.

FIG. 1 is a schematic plan view for illustrating a luminaire 1 according to an embodiment. FIG. 2 is a schematic side view for illustrating the luminaire 1. Note that FIG. 2 is an A-A arrow view in FIG. 1. FIG. 3 is a schematic sectional view for illustrating the luminaire 1. Note that FIG. 3 is a B-B sectional view in FIG. 1. FIG. 4 is a schematic diagram for illustrating a setting state of the luminaire 1.

As shown in FIGS. 1 to 3, a housing 2, a light-emitting module 3, and a cover 4 are provided in the luminaire 1. The housing 2 assumes a box shape. One end 2a of the housing 2 is opened. On the end 2a side of the housing 2, a flange section 2b projecting to the outside of the housing 2 is provided. The flange section 2b assumes an annular shape and is provided to surround the end 2a of the housing 2.

A space is provided on the inside of the flange section 2b. The space on the inside of the flange section 2b is connected to a space in which the light-emitting module 3 of the housing 2 is provided. When the cover 4 is attached, a second light transmitting section 4b of the cover 4 enters the space on the inside of the flange section 2b. In the flange section 2b, a not-shown retaining claw or the like for retaining the cover 4 can be provided.

The material of the housing 2 is not specifically limited. The housing 2 can be formed using, for example, a resin material or a metal material.

The light-emitting module 3 is provided on the inside of the housing 2. A substrate 3a and a light-emitting element 3b are provided in the light-emitting module 3. The substrate 3a assumes a tabular shape. A not-shown wiring pattern is provided on the surface of the substrate 3a. The material and the structure of the substrate 3a are not specifically limited. For example, the substrate 3a can be formed of an inorganic material (ceramics) such as aluminum oxide or aluminum nitride or an organic material such as paper phenol or glass epoxy. The substrate 3a may be a substrate obtained by coating the surface of a metal plate with an insulator. Note that, when the surface of the metal plate is coated with the insulator, the insulator may be an insulator made of an organic material or may be an insulator made of an inorganic material.

In this case, when a heat value of the light-emitting element 3b is large, from the viewpoint of thermal radiation, it is preferable to form the substrate 3a using a material having high heat conductivity. Examples of the material having high heat conductivity include ceramics such as aluminum oxide and aluminum nitride, high heat conductive resin, and a material obtained by coating the surface of a metal plate with an insulator.

The substrate 3a may be a single-layer substrate or a multilayer substrate.

A plurality of the light-emitting elements 3b are provided on the surface of the substrate 3a. The light-emitting element 3b can be, for example, a light emitting diode or a laser diode.

The light-emitting element 3b can be a light-emitting element including a surface mounting configuration in which the light-emitting element 3b is provided on the inside of an envelope and electrically connected to the wiring pattern of the substrate 3a via a lead.

Note that the light-emitting element 3b can include a COB (Chip On Board) configuration in which the light-emitting element 3b is joined to the substrate 3a and electrically connected to the wiring pattern of the substrate 3a via bonding wire.

A not-shown sealing section covering the light-emitting element 3b can be provided. A phosphor can be included in the not-shown sealing section. The phosphor can be, for example, a YAG phosphor (yttrium-aluminum-garnet phosphor).

For example, when the light-emitting element 3b is a blue light emitting diode and the phosphor is the YAG phosphor, the YAG phosphor is excited by blue light irradiated from the light-emitting element 3b. Yellow fluorescent light is emitted from the YAG phosphor. The blue light and the yellow light are mixed, whereby white light is irradiated from the luminaire 1. Note that a type of the phosphor and the type of the light-emitting element 3b are not limited to the illustrated types and can be changed as appropriate according to the use and the like of the luminaire 1 such that a desired light emission color is obtained.

An upper surface, which is a light irradiation surface, of the light-emitting element 3b is directed to the front surface side of the luminaire 1, i.e., the cover 4.

A disposing form of the plurality of light-emitting elements 3b is not specifically limited. For example, the disposing form of the plurality of light-emitting elements 3b can be a regular disposing form such as a matrix shape or a concentric circle shape or can be an arbitrary disposing form for unevenly distributing the plurality of light-emitting elements 3b in a predetermined region.

In this case, the disposing form and the number of the plurality of light-emitting elements 3b can be changed as appropriate on the basis of the size of the cover 4, the thickness dimension of the luminaire 1, and necessary brightness. For example, when the lateral dimension of the cover 4 is about 120 mm, the longitudinal dimension of the cover 4 is about 80 mm, and the thickness dimension of the luminaire 1 is about 20 mm, the number of the light-emitting elements 3b, which are light emitting diodes, can be set to eight. The eight light-emitting elements 3b can be disposed in a 4×2 matrix shape centering on substantially the center of the cover 4.

In the light-emitting module 3, circuit components including a power-supply element such as a connector or a terminal for supplying electric power from the outside, a control element for controlling a lighting state of the light-emitting element 3b, a switch element for switching a power-supply state, and a protection element for protecting the light-emitting element 3b can be provided as appropriate according to necessity.

The cover 4 is provided on an irradiation side of the light-emitting element 3b. The cover 4 is provided to cover the opening of the housing 2. In the cover 4, a first light transmitting section 4a and a second light transmitting section 4b are provided. The first light transmitting section 4a assumes, for example, a tabular shape and is provided on the center side of the cover 4. However, the shape of the first light transmitting section 4a is not limited to the illustrated shape. The shape of the first light transmitting section 4a can be, for example, a curved surface shape, convex or concave, on the center side besides the tabular shape (a plane shape).

The first light transmitting section 4a is provided in order to suppress glare. Therefore, in the first light transmitting section 4a, light transmittance is set low in order to reduce the intensity of incident light.

For example, the light transmittance can be reduced by applying diffusion treatment such as blasting to at least one of an incident surface 4a1 and an irradiation surface 4a2 of the first light transmitting section 4a or providing a scattering layer including a scattering material on one of the incident surface 4a1 and the irradiation surface 4a2. The light transmittance can be reduced by forming the first light transmitting section 4a from a translucent material including a scattering material. The scattering material can be added with, for example, particulates having a refractive index different from the refractive index of a main agent (a translucent material). The scattering material can be, for example, particulates made of titanium oxide or the like.

In this case, if the light linear transmittance in the first light transmitting section 4a is set to be equal to or lower than 60%, it is possible to effectively suppress glare. If the light linear transmittance in the first light transmitting section 4a is set to be equal to or higher than 30% and equal to or lower than 50%, it is possible to more effectively suppress glare without spoiling functions of the luminaire.

Note that, in this specification, low light transmittance does not mean high light absorptance. The low light transmittance means that most of light not transmitted through the first light transmitting section 4a is reflected. The light reflected by the first light transmitting section 4a is reflected on the inner wall surface of the housing 2, the surface of the substrate 3a, or the like. Finally, most of the light is transmitted through the first light transmitting section 4a.

The second light transmitting section 4b is provided at the peripheral edge of the first light transmitting section 4a. The second light transmitting section 4b is provided to attain improvement of a rendering property through a glittering feeling. Therefore, the second light transmitting section 4b has light transmittance higher than the light transmittance of the first light transmitting section 4a.

For example, the second light transmitting section 4b can be formed using a light transmissive material having linear transmittance equal to or higher than 80%.

As explained above, the light scattering property of the first light transmitting section 4a is higher than the light scattering property of the second light transmitting section 4b. The light rectilinearity of the second light transmitting section 4b is higher than the light rectilinearity of the first light transmitting section 4a.

The second light transmitting section 4b includes an incident surface 4b1, a first irradiation surface 4b2, and a second irradiation surface 4b3.

Light irradiated from the light-emitting element 3b is made incident on the incident surface 4b1. The incident surface 4b1 is provided in a direction crossing the first irradiation surface 4b2. In the case of the luminaire illustrated in FIG. 3, the incident surface 4b1 is provided in a direction orthogonal to the first irradiation surface 4b2.

The incident surface 4b1 is provided in a position where direct light emitted from the light-emitting element 3b can be made incident. For example, the incident surface 4b1 can be provided in the vicinity of an end on the center side of the housing 2.

The first irradiation surface 4b2 is provided to be substantially parallel to the irradiation surface 4a2 of the first light transmitting section 4a. In this case, the first irradiation surface 4b2 and the irradiation surface 4a2 of the first light transmitting section 4a can be provided in substantially the same plane.

The first irradiation surface 4b2 irradiates light made incident from the incident surface 4b1 toward the front surface side of the luminaire 1.

The second irradiation surface 4b3 is provided in a direction crossing the first irradiation surface 4b2. In the case of the luminaire shown in FIG. 3, the second irradiation surface 4b3 is provided in a direction orthogonal to the first irradiation surface 4b2.

The second irradiation surface 4b3 irradiates light in a direction different from a direction in which the first irradiation surface 4b2 irradiates light.

A part of the light irradiated from the light-emitting element 3b is made incident on the incident surface 4b1 of the second light transmitting section 4b, propagated through the inside of the second light transmitting section 4b, and irradiated from the first irradiation surface 4b2 and the second irradiation surface 4b3 of the second light transmitting section 4b.

In this case, since the light transmittance of the second light transmitting section 4b is high, it is possible to suppress the intensity of the light irradiated from the first irradiation surface 4b2 and the second irradiation surface 4b3 from decreasing.

Therefore, it is possible to irradiate shining light from the first irradiation surface 4b2 to the front surface side of the luminaire 1. It is possible to irradiate shining light from the second irradiation surface 4b3 to the side surface side of the luminaire 1.

As shown in FIG. 4, the luminaire 1 is set on the inside of a hole 100a provided in a wall 100 in an interior compartment of an automobile or the like.

The position of the end 2a of the housing 2 and a surface 100b of the wall 100 are set to be present in substantially the same plane. Therefore, the cover 4 projects from the surface 100b of the wall 100 toward the interior compartment of the automobile or the like.

From the irradiation surface 4a2 of the first light transmitting section 4a having a wide area, light L1 having suppressed glare and a soft feel is irradiated toward the interior compartment of the automobile or the like. From the first irradiation surface 4b2 provided at the peripheral edge of the irradiation surface 4a2 and assuming a linear shape, shining light L2 is irradiated toward the interior compartment of the automobile or the like.

Therefore, when a user sees the luminaire 1 in a lighting state, the linear shining light L2 is seen surrounding the planar soft-feel light L1.

With the luminaire 1 according to this embodiment, it is possible to attain suppression of glare and improvement of a rendering property through a glittering feeling.

Shining light L3 is irradiated from the second irradiation surface 4b3 to the side surface side of the luminaire 1. Therefore, since the light L3 is irradiated on the surface 100b of the wall 100 around the luminaire 1, it is possible to cause the user to feel the spread of light and it is possible to increase a feeling of brightness. In this case, since the thickness dimension of the cover 4 can be reduced, even if the cover 4 is projected from the surface 100b of the wall 100 toward the interior compartment of the automobile or the like, the user does not have a feeling of oppression.

Figure 5:
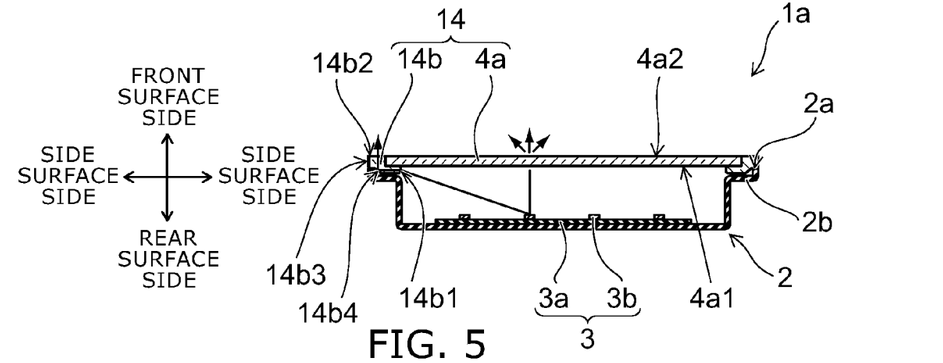
FIG. 5 is a schematic sectional view for illustrating a luminaire provided with a cover according to another embodiment.

FIG. 5 is a schematic sectional view for illustrating a luminaire 1a provided with a cover 14 according to another embodiment. As shown in FIG. 5, the housing 2, the light-emitting module 3, and the cover 14 are provided in the luminaire 1a.

The first light transmitting section 4a and a second light transmitting section 14b are provided in the cover 14. The second light transmitting section 14b is provided in the peripheral edge of the first light transmitting section 4a. The second light transmitting section 14b is provided to attain improvement of a rendering property through a glittering feeling. Therefore, the second light transmitting section 14b has light transmittance higher than the light transmittance of the first light transmitting section 4a. For example, the second light transmitting section 14b can be formed using a light transmissive material having linear transmittance equal to or higher than 80%.

The second light transmitting section 14b includes an incident surface 14b1, a first irradiation surface 14b2, a second irradiation surface 14b3, and a reflection surface 14b4. The incident surface 14b1 can be the same as the incident surface 4b1. The first irradiation surface 14b2 can be the same as the first irradiation surface 4b2. The second irradiation surface 14b3 can be the same as the second irradiation surface 4b3.

The reflection surface 14b4 is provided on the opposite side of a light incident side of the incident surface 14b1. The reflection surface 14b4 reflects light made incident from the incident surface 14b1 toward the first irradiation surface 14b2 and the second irradiation surface 14b3. The reflection surface 14b4 inclines in a direction in which an end on the outer side of the luminaire 1a approaches the first irradiation surface 14b2.

A part of light irradiated from the light-emitting element 3b is made incident on the incident surface 14b1 of the second light transmitting section 14b, propagated through the inside of the second light transmitting section 14b, and made incident on the reflection surface 14b4. The light made incident on the reflection surface 14b4 is totally reflected. The traveling direction of the light is changed such that the light travels to the first irradiation surface 14b2 and the second irradiation surface 14b3. The light, the traveling direction of which is changed by the reflection surface 14b4, is irradiated from the first irradiation surface 14b2 and the second irradiation surface 14b3.

If the reflection surface 14b4 is provided, it is possible to reduce a loss when the traveling direction of the light is changed on the inside of the second light transmitting section 14b. Therefore, it is possible to improve light extracting efficiency via the second light transmitting section 14b.

Figure 6:
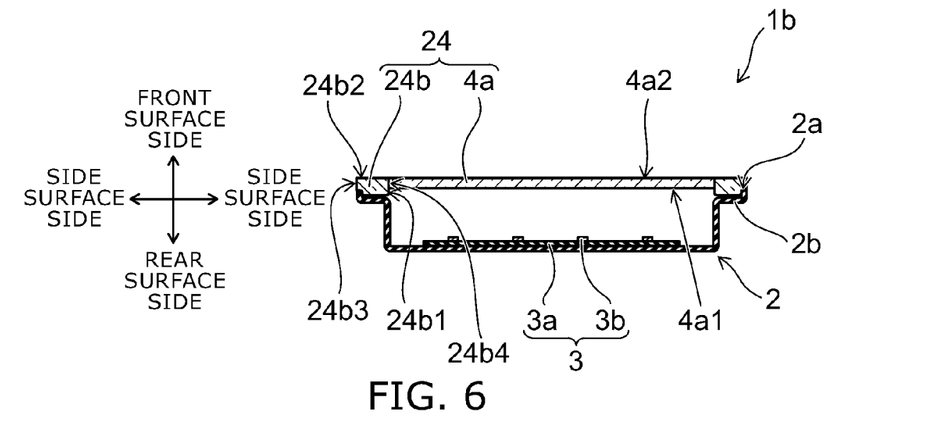
FIG. 6 is a schematic sectional view for illustrating a luminaire provided with a cover according to another embodiment.

FIG. 6 is a schematic sectional view for illustrating a luminaire 1b provided with a cover 24 according to another embodiment. As shown in FIG. 6, the housing 2, the light-emitting module 3, and the cover 24 are provided in the luminaire 1b.

The first light transmitting section 4a and a second light transmitting section 24b are provided in the cover 24. The second light transmitting section 24b is provided at the peripheral edge of the first light transmitting section 4a. The second light transmitting section 24b is provided in order to attain improvement of a rendering property through a glittering feeling. Therefore, the second light transmitting section 24b has light transmittance higher than the light transmittance of the first light transmitting section 4a. For example, the second light transmitting section 24b can be formed using a light transmissive material having linear transmittance equal to or higher than 80%.

The second light transmitting section 24b includes an incident surface 24b1, a first irradiation surface 24b2, a second irradiation surface 24b3, and a connection surface 24b4. The first irradiation surface 24b2 can be the same as the first irradiation surface 4b2. The second irradiation surface 24b3 can be the same as the second irradiation surface 4b3.

The incident surface 24b1 can be the same as the incident surface 4b1. The connection surface 24b4 is opposed to the peripheral edge of the first light transmitting section 4a. The connection surface 24b4 is connected to the peripheral edge of the first light transmitting section 4a.

The connection surface 24b4 is present in a plane substantially the same as the incident surface 24b1.

That is, the peripheral edge of the first light transmitting section 4a is not located further on the outside of the luminaire 1b than the incident surface 24b1. Therefore, light made incident on the inside of the second light transmitting section 24b from the incident surface 24b1 is irradiated from the first irradiation surface 24b2 and the second irradiation surface 24b3 without being blocked by the first light transmitting section 4a. Therefore, it is possible to improve light extracting efficiency via the second light transmitting section 24b.

Figure 7:
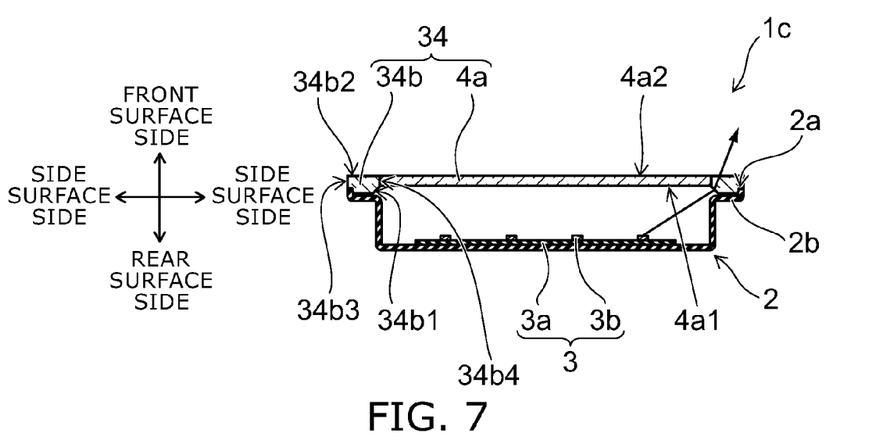
FIG. 7 is a schematic sectional view for illustrating a luminaire provided with a cover according to another embodiment.

FIG. 7 is a schematic sectional view for illustrating a luminaire 1c provided with a cover 34 according to another embodiment. As shown in FIG. 7, the housing 2, the light-emitting module 3, and the cover 34 are provided in the luminaire 1c.

The first light transmitting section 4a and a second light transmitting section 34b are provided in the cover 34. The second light transmitting section 34b is provided at the peripheral edge of the first light transmitting section 4a. The second light transmitting section 34b is provided in order to attain improvement of a rendering property through a glittering feeling. Therefore, the second light transmitting section 34b has light transmittance higher than light transmittance of the first light transmitting section 4a. For example, the second light transmitting section 34b can be formed using a light transmissive material having linear transmittance equal to or higher than 80%.

The second light transmitting section 34b includes an incident surface 34b1, a first irradiation surface 34b2, a second irradiation surface 34b3, and a connection surface 34b4. The first irradiation surface 34b2 can be the same as the first irradiation surface 24b2. The second irradiation surface 34b3 can be the same as the second irradiation surface 24b3.

The connection surface 34b4 can be the same as the connection surface 24b4. The incident surface 34b1 projects from the incident surface 4a1 of the first light transmitting section 4a. In the incident surface 34b1, an end on the light-emitting module 3 side inclines in a direction toward the outside of the luminaire 1c.

Therefore, it is easy to refract light made incident on the incident surface 34b1 toward the first irradiation surface 34b2 and directly irradiate the light from the first irradiation surface 34b2. It is possible to increase the area of the incident surface 34b1. As a result, it is possible to improve light extracting efficiency via the second light transmitting section 34b.

Figure 8A:
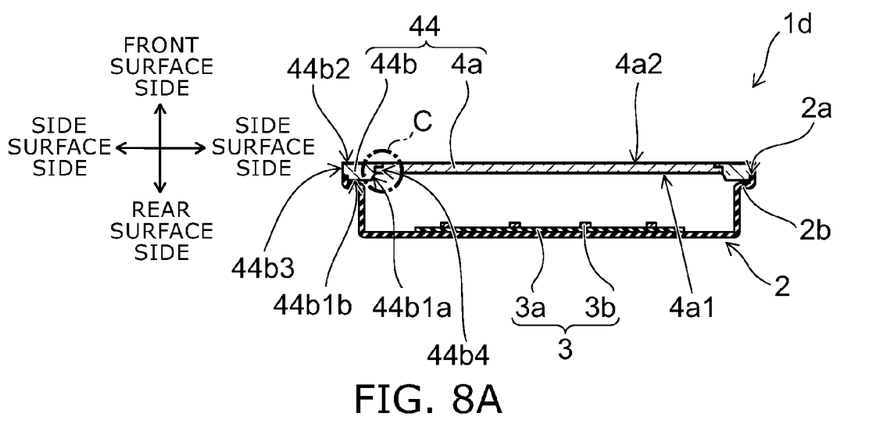
FIG. 8A is a schematic sectional view for illustrating a luminaire provided with a cover according to another embodiment.
Figure 8B:
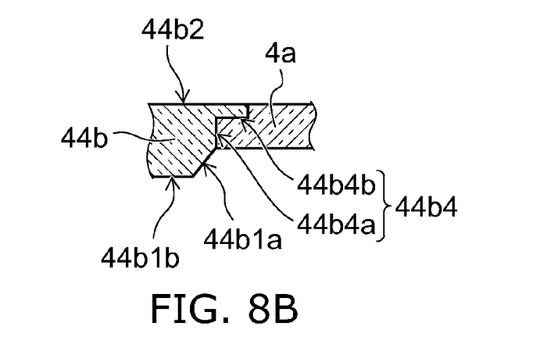
FIG. 8B is a schematic enlarged view of a C section shown in FIG. 8A.

FIG. 8A is a schematic sectional view for illustrating a luminaire 1d provided with a cover 44 according to another embodiment. FIG. 8B is a schematic enlarged view of a C section shown in FIG. 8A. As shown in FIG. 8A, the housing 2, the light-emitting module 3, and the cover 44 are provided in the luminaire 1d.

The first light transmitting section 4a and a second light transmitting section 44b are provided in the cover 44. The second light transmitting section 44b is provided at the peripheral edge of the first light transmitting section 4a. The second light transmitting section 44b is provided to attain improvement of a rendering property through a glittering feeling. Therefore, the second light transmitting section 44b has light transmittance higher than the light transmittance of the first light transmitting section 4a. For example, the second light transmitting section 44b can be formed using a light transmissive material having linear transmittance equal to or higher than 80%.

The second light transmitting section 44b includes a first incident surface 44b1a, a second incident surface 44b1b, a first irradiation surface 44b2, a second irradiation surface 44b3, and a connection surface 44b4. The first irradiation surface 44b2 can be the same as the first irradiation surface 34b2. The second irradiation surface 44b3 can be the same as the second irradiation surface 34b3.

As shown in FIG. 8B, the connection surface 44b4 includes a first connection surface 44b4a and a second connection surface 44b4b. The first connection surface 44b4a is opposed to the peripheral edge of the first light transmitting section 4a. The first connection surface 44b4a is connected to the peripheral edge of the first light transmitting section 4a. The second connection surface 44b4b is provided to be substantially parallel to the irradiation surface 4a2 of the first light transmitting section 4a.

If the connection surface 44b4 includes the first connection surface 44b4a and the second connection surface 44b4b, it is possible to increase a connection area between the second light transmitting section 44b and the first light transmitting section 4a. Therefore, it is possible to improve connection strength between the first light transmitting section 4a and the second light transmitting section 44b.

For example, if the first light transmitting section 4a and the second light transmitting section 44b are integrally molded using a two-color molding method (a double mold method), it is possible to improve productivity. In this case, if the connection surface 44b4 includes the first connection surface 44b4a and the second connection surface 44b4b, it is possible to improve the connection strength between the first light transmitting section 4a and the second light transmitting section 44b. Therefore, it is possible to perform stable molding.

The first incident surface 44b1a projects from the incident surface 4a1 of the first light transmitting section 4a. In the first incident surface 44b1a, an end on the light-emitting module 3 side inclines to a direction toward the outside of the luminaire 1d. The second incident surface 44b1b is coupled to the first incident surface 44b1a and is provided to be substantially parallel to the incident surface 4a1 of the first light transmitting section 4a. Therefore, it is easy to refract light made incident on the first incident surface 44b1a and the second incident surface 44b1b toward the first irradiation surface 44b2 and directly irradiate the light from the first irradiation surface 44b2.

Since the second incident surface 44b1b is provided in addition to the first incident surface 44b1a, it is possible to increase the area of an incident surface. Therefore, it is possible to increase light emission amounts from the first irradiation surface 44b2 and the second irradiation surface 44b3. As a result, it is possible to improve light extracting efficiency via the second light transmitting section 44b.

Figure 9:
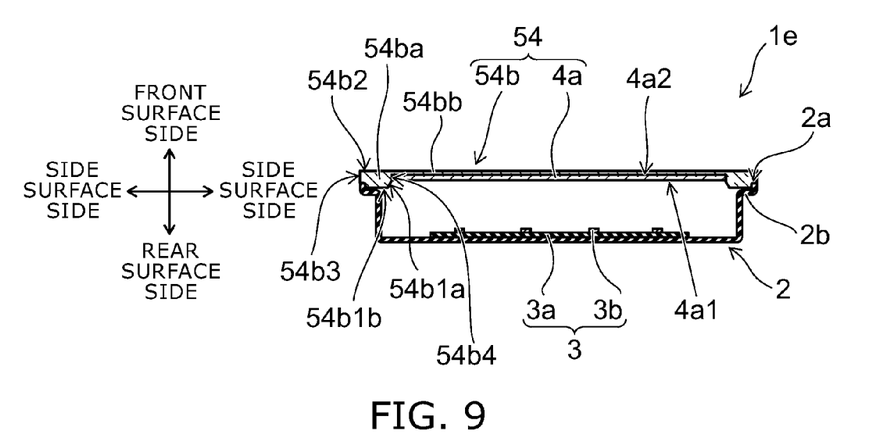
FIG. 9 is a schematic sectional view for illustrating a luminaire provided with a cover according to another embodiment.

FIG. 9 is a schematic sectional view for illustrating a luminaire 1e provided with a cover 54 according to another embodiment. As shown in FIG. 9, the housing 2, the light-emitting module 3, and the cover 54 are provided in the luminaire 1e. The first light transmitting section 4a and a second light transmitting section 54b are provided in the cover 54. The second light transmitting section 54b includes a peripheral edge section 54ba and a center section 54bb.

The peripheral edge section 54ba is provided at the peripheral edge of the first light transmitting section 4a. The peripheral edge section 54ba is provided to attain improvement of a rendering property through a glittering feeling.

Therefore, the peripheral edge section 54ba has light transmittance higher than the light transmittance of the first light transmitting section 4a. For example, the peripheral edge section 54ba can be formed using a light transmissive material having linear transmittance equal to or higher than 80%.

The peripheral edge section 54ba includes a first incident surface 54b1a, a second incident surface 54b1b, a first irradiation surface 54b2, a second irradiation surface 54b3, and a connection surface 54b4. The first incident surface 54b1a and the second incident surface 54b1b can be the same as the first incident surface 44b1a and the second incident surface 44b1b. The first irradiation surface 54b2 can be the same as the first irradiation surface 44b2. The second irradiation surface 54b3 can be the same as the second irradiation surface 44b3. The connection surface 54b4 can be the same as the first connection surface 44b4a.

The center section 54bb is provided to cover the irradiation surface 4a2 of the first light transmitting section 4a. The upper surface of the center section 54bb and the first irradiation surface 54b2 are present in substantially the same plane.

The material of the center section 54bb can be the same as the material of the peripheral edge section 54ba. The center section 54bb and the peripheral edge section 54ba can be integrally molded. Note that the first light transmitting section 4a and the second light transmitting section 54b including the center section 54bb and the peripheral edge section 54ba can be integrally molded.

Light irradiated from the light-emitting element 3b and made incident on the first light transmitting section 4a changes to scattered emitted light. Therefore, light having suppressed glare and a soft feel is irradiated. The light irradiated from the first light transmitting section 4a is transmitted through the center section 54bb and irradiated to the outside of the luminaire 1e.

Light irradiated from the light-emitting element 3b and made incident on the peripheral edge section 54ba is irradiated to the outside of the luminaire 1e from the first irradiation surface 54b2 and the second irradiation surface 54b3. In this case, the light irradiated from the first irradiation surface 54b2 and the second irradiation surface 54b3 is shining light.

Therefore, it is possible to attain suppression of glare and improvement of a rendering property through a glittering feeling. Furthermore, since the upper surface of the center section 54bb and the first irradiation surface 54b2 are present in substantially the same plane, simple design of the luminaire 1e is obtained. Therefore, it is possible to improve product marketability.

Figure 10:
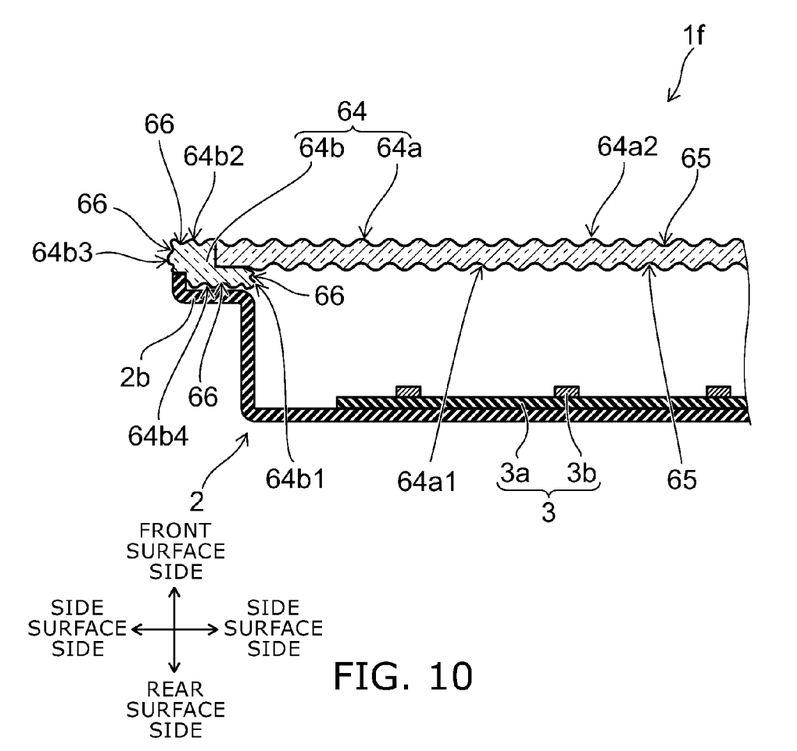
FIG. 10 is a schematic partial sectional view for illustrating a luminaire provided with a cover according to another embodiment.

FIG. 10 is a schematic partial sectional view for illustrating a luminaire 1f provided with a cover 64 according to another embodiment. As shown in FIG. 10, the housing 2, the light-emitting module 3, and the cover 64 are provided in the luminaire 1f. A first light transmitting section 64a and a second light transmitting section 64b are provided in the cover 64.

The first light transmitting section 64a can be the same as the first light transmitting section 4a. However, a plurality of concave sections 65 are provided on an incident surface 64a1 and an irradiation surface 64a2 of the first light transmitting section 64a.

The concave section 65 can be, for example, a curved surface lens having a spherical concave surface. The concave section 65 can be a design pattern having an arbitrary shape.

Note that the plurality of concave sections 65 can be provided on at least one of the incident surface 64a1 and the irradiation surface 64a2. In this case, on the incident surface 64a1 and the irradiation surface 64a2, the size, the shape, the number, the disposing density, and the like of the concave sections 65 can be changed.

The second light transmitting section 64b can be the same as the second light transmitting section 4b. However, a plurality of concave sections 66 are provided on an incident surface 64b1, a first irradiation surface 64b2, a second irradiation surface 64b3, and a lower surface 64b4 of the second light transmitting section 64b. The concave section 66 can be, for example, a curved surface lens having a spherical concave surface. The concave section 66 can be a design pattern having an arbitrary shape. The concave section 66 can be the same as the concave section 65.

Note that the plurality of concave sections 66 can be provided on at least one of the incident surface 64b1, the first irradiation surface 64b2, the second irradiation surface 64b3, and the lower surface 64b4.

In this case, on the incident surface 64b1, the first irradiation surface 64b2, the second irradiation surface 64b3, and the lower surface 64b4, the size, the shape, the number, the disposing density, and the like of the concave sections 66 can be changed.

If the lens or the design pattern is provided on the surface of the first light transmitting section 64a and the second light transmitting section 64b, the level of the intensity of irradiated light appears as design. Therefore, it is possible to further attain improvement of a rendering property.

Note that the concave section 65 and the concave section 66 can also be applied to the covers according to the embodiments explained above.

Figure 11A:
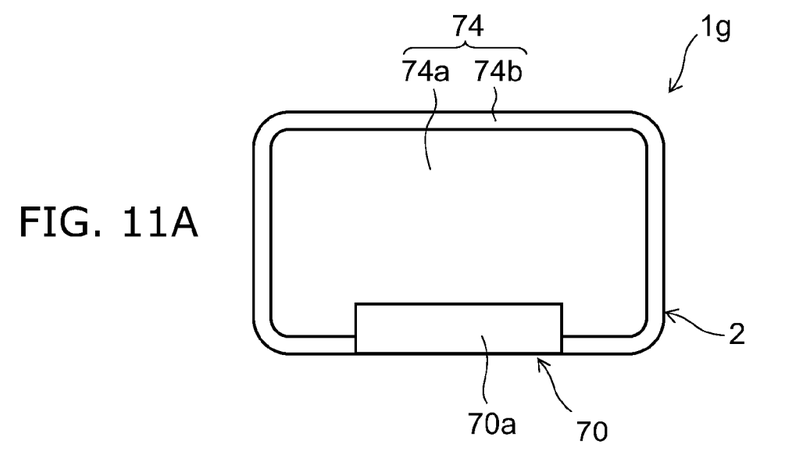
FIGS. 11A and 11B are schematic plan views for illustrating a luminaire provided with a cover according to another embodiment.
Figure 11B:
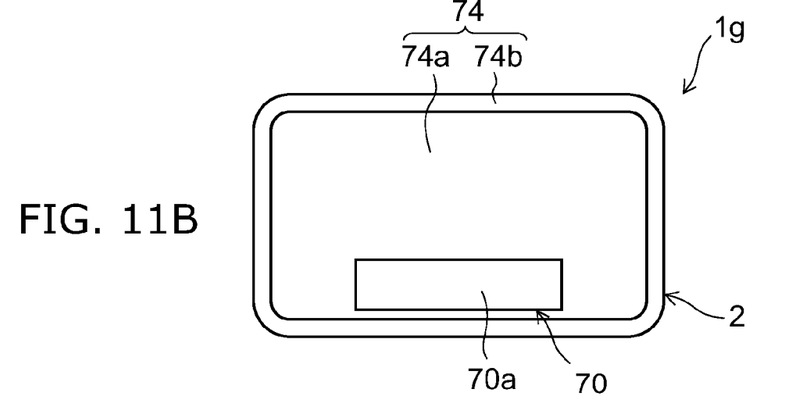

FIGS. 11A and 11B are schematic plan view for illustrating a luminaire 1g provided with a cover 74 according to another embodiment. As shown in FIGS. 11A and 11B, the housing 2, the cover 74, and a switch 70 are provided in the luminaire 1g.

Although not shown in the figure, as in the luminaires explained above, the light-emitting module 3 is provided on the inside of the housing 2.

In the configuration shown in FIG. 11A, a first light transmitting section 74a and a second light transmitting section 74b are provided in the cover 74. The first light transmitting section 74a can be the same as the first light transmitting section 4a. The second light transmitting section 74b can be the same as the second light transmitting section 4b. However, cutouts for exposing an operation surface 70a of the switch 70 are provided in the first light transmitting section 74a and the second light transmitting section 74b.

The switch 70 is provided with the operation surface 70a exposed from the surface of the cover 74. The switch 70 can include, for example, a not-shown slide operation section on the operation surface 70a. The switch 70 can be, for example, a switch for lighting the light-emitting element 3b by moving a not-shown slide operation section to an ON position and extinguishing the light-emitting element 3b by moving the not-shown slide operation section to an OFF position.

The switch 70 can be, for example, a switch for lighting or extinguishing the light-emitting element 3b by moving the not-shown slide operation section between the ON position and the OFF position to light or extinguish the light-emitting element 3b in association with opening and closing of a door of an automobile or the like.

As shown in FIG. 11B, the switch 70 may be arranged in the first light transmitting section 74a and the second light transmitting section 74b may be arranged around the first light transmitting section 74a.

The shape, the size, the number, the arrangement position, and the like of the switch 70 are not limited to those illustrated above and can be changed as appropriate.

When the operation surface 70a of the switch 70 is exposed from the surface of the cover 74, light is not irradiated from a portion where the operation surface 70a of the switch 70 is exposed. However, the light having suppressed glare and a soft feel and the glittering light are irradiated from a portion where the operation surface 70a of the switch 70 is not exposed.

Therefore, even if the operation surface 70a of the switch 70 is exposed from the surface of the cover 74, it is possible to attain suppression of glare and improvement of a rendering property through a glittering feeling.

Note that the switch 70 can also be applied to the luminaires according the embodiments explained above.

Figure 12:
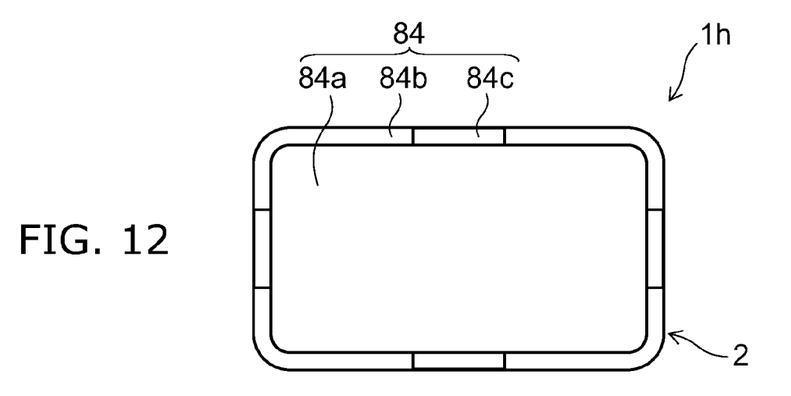
FIG. 12 is a schematic plan view for illustrating a luminaire provided with a cover according to another embodiment.

FIG. 12 is a schematic plan view for illustrating a luminaire 1h provided with a cover 84 according to another embodiment. As shown in FIG. 12, the housing 2 and the cover 84 are provided in the luminaire 1h. Although not shown in the figure, the light-emitting module 3 is provided on the inside of the housing 2 as in the luminaires explained above.

A first light transmitting section 84a and a second light transmitting section 84b are provided in the cover 84. The first light transmitting section 84a can be the same as the first light transmitting section 4a. The second light transmitting section 84b can be the same as the second light transmitting section 4b. However, the second light transmitting section 84b is divided into a plurality of portions. A portion 84c having different light transmittance is provided between the divided second light transmitting sections 84b.

The light transmittance of the portion 84c is not specifically limited as long as the light transmittance of the portion 84c is lower than the light transmittance of the second light transmitting section 84b. For example, the light transmittance of the portion 84c can be equivalent to the light transmittance of the first light transmitting section 84a. The portion 84c may be a portion that does not transmit light.

If the portion 84c is provided, the level of the intensity of irradiated light appears as design. Therefore, it is possible to further attain improvement of a rendering property. In this case, it is possible to control the rendering property by changing the number, the size, the disposing position, the light transmittance, and the like of the portion 84c as appropriate.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A luminaire for an interior lamp provided in an automobile comprising:
    a light-emitting element; and
    a cover provided on an irradiation side of the light-emitting element, wherein
    the cover includes:
        a first light transmitting section provided on a center side of the cover; and
        a second light transmitting section provided at a peripheral edge of the first light transmitting section and having light transmittance higher than light transmittance of the first light transmitting section, the second light transmitting section having a first irradiation surface and a second irradiation surface, the first irradiation surface configured to irradiate the light toward a front surface side of the luminaire, the second irradiation surface configured to irradiate the light in a direction different from a direction in which the first irradiation surface irradiates the light, a total area of the first irradiation surface and the second irradiation surface being smaller than an area of the first light transmitting section, and light emission amounts transmitted through the first light transmitting section being larger than light emission amounts transmitted through the second light transmitting section.

2. The luminaire according to claim 1, wherein
    a light scattering property of the first light transmitting section is higher than a light scattering property of the second light transmitting section, and
    light rectilinearity of the second light transmitting section is higher than light rectilinearity of the first light transmitting section.

3. The luminaire according to claim 1, wherein the second light transmitting section includes:
    an incident surface on which light irradiated from the light-emitting element is made incident,
    wherein the first irradiation surface is configured to irradiate the light made incident from the incident surface of the second light transmitting section toward the front surface side of the luminaire, and
    wherein the incident surface of the second light transmitting section is provided in a position where direct light emitted from the light-emitting element can be made incident.

4. The luminaire according to claim 1, wherein the second light transmitting section includes:
    an incident surface on which light irradiated from the light-emitting element is made incident,
    wherein the first irradiation surface is configured to irradiate the light made incident from the incident surface of the second light transmitting section toward the front surface side of the luminaire, and
    the incident surface of the second light transmitting section is provided in a direction crossing the first irradiation surface.

5. The luminaire according to claim 3, wherein the second light transmitting section further includes a reflection surface provided on an opposite side of a light incident side of the incident surface and configured to reflect the light made incident from the incident surface toward the first irradiation surface.

6. The luminaire according to claim 1, wherein diffusion treatment is applied to at least one of an incident surface and an irradiation surface of the first light transmitting section.

7. The luminaire according to claim 1, wherein a scattering layer including a scattering material is provided on at least one of an incident surface and an irradiation surface of the first light transmitting section.

8. The luminaire according to claim 1, wherein the first light transmitting section is formed of a translucent material including a scattering material.

9. The luminaire according to claim 1, wherein light linear transmittance in the first light transmitting section is equal to or lower than 60%.

10. The luminaire according to claim 1, wherein light linear transmittance in the first light transmitting section is equal to or higher than 30% and equal to or lower than 50%.

11. The luminaire according to claim 1, wherein light linear transmittance in the second light transmitting section is equal to or higher than 80%.

12. The luminaire according to claim 1, wherein the second light transmitting section further includes a connection surface opposed to a peripheral edge of the first light transmitting section.

13. The luminaire according to claim 12, wherein the connection surface and an incident surface of the second light transmitting section are present in a same plane.

14. The luminaire according to claim 3, wherein a plurality of concave sections are provided on the incident surface and the first irradiation surface of the second light transmitting section.

15. The luminaire according to claim 3, wherein, in the incident surface of the second light transmitting section, an end on the light-emitting element side inclines to a direction toward an outside of the luminaire.

16. The luminaire according to claim 3, wherein the first irradiation surface of the second light transmitting section is provided to be parallel to an irradiation surface of the first light transmitting section.

17. The luminaire according to claim 3, wherein the first irradiation surface of the second light transmitting section and an irradiation surface of the first light transmitting section are present in a same plane.

18. The luminaire according to claim 5, wherein, in the reflection surface of the second light transmitting section, an end on an outer side of the luminaire inclines to a direction approaching the first irradiation surface of the second light transmitting section.

19. The luminaire according to claim 1, wherein the second irradiation surface of the second light transmitting section is provided in a direction crossing the first irradiation surface of the second light transmitting section.

* * * * *